Nov. 30, 1965  A. VISCHER, JR  3,220,856
FROZEN FOOD PACKAGE
Filed Jan. 31, 1962  2 Sheets-Sheet 1
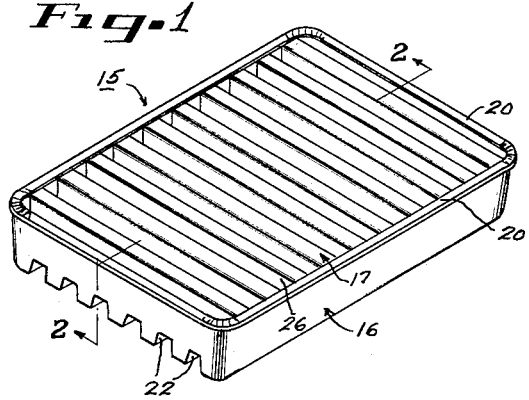
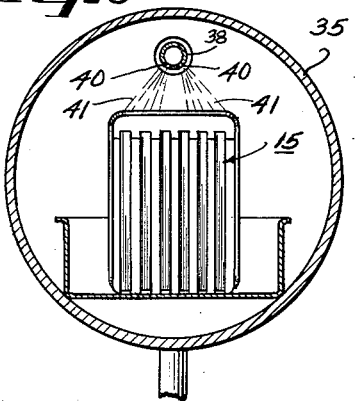
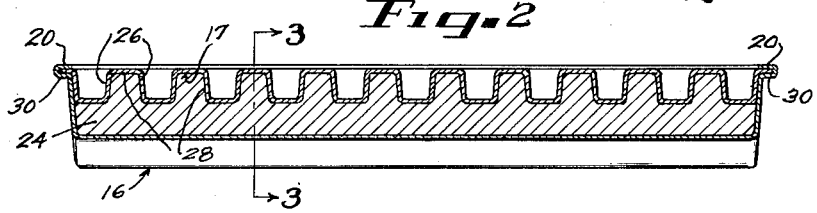
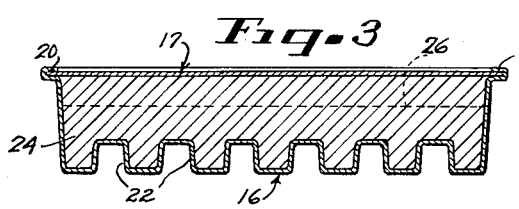
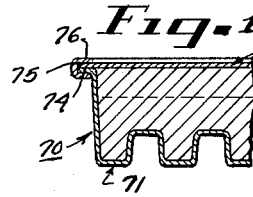
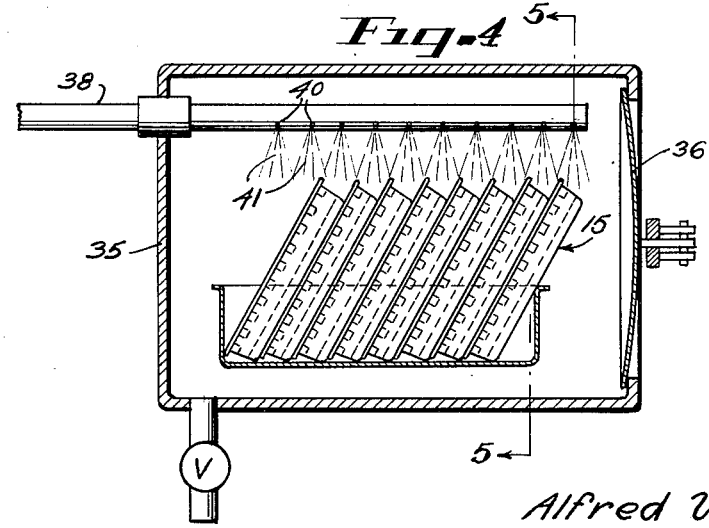
INVENTOR.
Alfred Vischer, Jr.
BY
Fidler, Beardsley & Bradley
ATTORNEYS

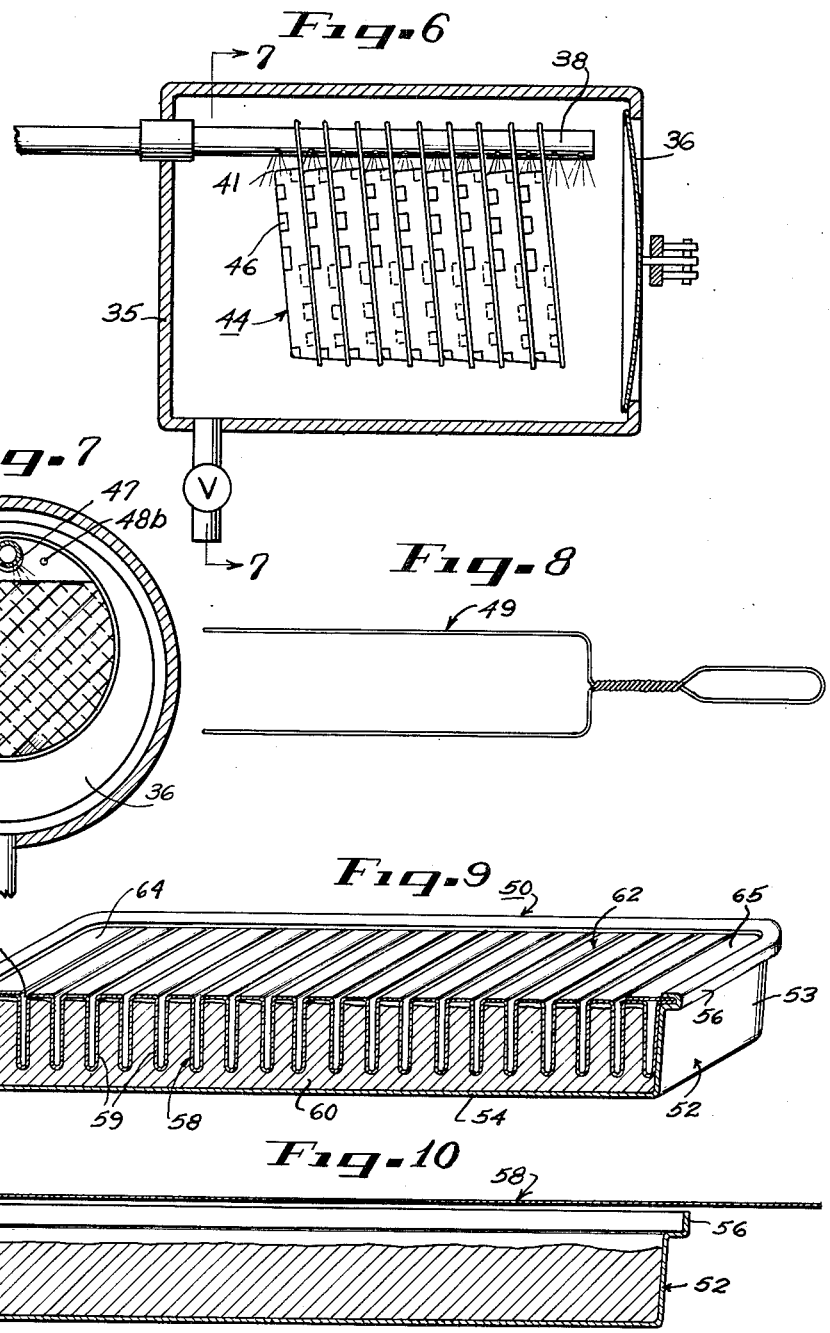

United States Patent Office 3,220,856
Patented Nov. 30, 1965

3,220,856
FROZEN FOOD PACKAGE
Alfred Vischer, Jr., 909 S. Cumberland Ave.,
Park Ridge, Ill.
Filed Jan. 31, 1962, Ser. No. 170,172
5 Claims. (Cl. 99—192)

The present invention relates to food packages and it more particularly relates to new and improved packages in which pre-cooked foods and some fresh foods such as spinach, are frozen in a more or less solid block to be stored and later heated or cooked and served without prior defrosting.

The purpose of pre-cooking food is primarily to save time later on when the food can be served without further cooking and in order to give this pre-cooked food shelf life, it is packaged and frozen. Accordingly, the product requires defrosting and heating before it can be served.

A further advantage of precooked frozen food stems from the fact that large quantities can be prepared at low cost, seasoned under precision control to the queen's taste to guarantee uniformity and perfection of the product. The main difficulty with this technique, however, is the excessive time required to defrost, heat and serve the pre-cooked food. This often takes longer than is required to prepare the same meal fresh from the start.

In the past, food packers have seen the many advantages of marketing frozen, pre-cooked food, but they have discounted the great loss of time required to defrost and then heat the food to the serving temperature. This is now looming as the one major stumbling block to the complete success of the entire system. Consequently, packers generally have been seeking better equipment to more efficiently heat the frozen packages instead of seeking a package that would more efficiently transfer the available heat to the frozen product from the various heat generators now available.

Therefore, it is an object of the present invention to provide a new and improved frozen food package.

Another object of the present invention is to provide a new and improved frozen food package having improved means for transferring heat from a high temperature cooking medium to the packaged item.

A further object of the present invention is to provide a new type package for frozen foods which reduces the depth into the food item which the heat must penetrate.

Briefly, the above and further objects are realized in accordance with the present invention by providing a frozen food package in which the frozen food item is enclosed within a container formed of a low mass, good heat conducting material such, for example, as an aluminum sheet, and which includes a plurality of open mouthed, hollow fins extending a substantial distance into the food in intimate contact therewith whereby an ambient heating fluid, such, for example, as steam, may flow into and through the fins and thus be proximately located with respect to all portions of the frozen item.

Further objects and advantages and a better understanding of the present invention may be had by reference to the following detailed description taken in connection with the accompanying drawings in which:

FIG. 1 is a schematic view of a frozen food package embodying the present invention;

FIG. 2 is a cross-sectional view of the package of FIG. 1 taken along the line 2—2 thereof;

FIG. 3 is a cross-sectional view of the package of FIG. 2 taken along the line 3—3 thereof assuming the entire package to be shown therein;

FIG. 4 is a cross-sectional view of a pressure cooker in which is shown a plurality of the packages of FIGS. 1–3 during a cooking operation;

FIG. 5 is a cross-sectional view of the cooker of FIG. 4 taken along the line 5—5 thereof;

FIG. 6 is a cross-sectional view of a pressure cooker in which is shown a plurality of frozen food packages of alternate configuration also embodying the present invention;

FIG. 7 is a cross-sectional view taken along the line 7—7 of FIG. 6;

FIG. 8 illustrates a tool useful in removing the frozen food packages of FIGS. 6 and 7 from the associated cooker;

FIG. 9 is a schematic view, partly in cross-section, illustrating still another embodiment of this invention;

FIG. 10 is a cross-sectional view of the frozen food package of FIG. 9; and

FIG. 11 is a fragmentary sectional view illustrating another embodiment of this invention.

Before referring in detail to the drawings, a better understanding of the present invention may be had by a more general consideration of the various features and advantages of this invention. Basically, this invention relates to a new type package which reduces the depth to which heat must penetrate the frozen product in order to raise its temperature to the desired level. In accordance with one such feature, the physical configuration of the frozen product is such that the ratio of the heat radiating or transferring surface of the packaged product to the mass or volume thereof is substantially larger than that provided in prior art configurations. Moreover, the package of the present invention is so designed as to function as the container in which the food is to be cooked, and in accordance with a further inventive feature, such package is designed to facilitate removal of the contents after it has been cooked.

Referring now to the drawings and particularly to FIG. 1 thereof, there is shown a package for frozen food, generally designated 15 which includes a shallow tray 16 to which a cover 17 is attached. The members 16 and 17 constitute the sole enclosure for a frozen food product packed therein, and they are formed of a good heat conducting material such, for example, as aluminum. The cover 17 may be held in place by the inturned lip portions 20 provided along the upper edges of the tray 16.

The tray 16 may be generally rectangular in cross-section so as to facilitate storage and handling of the package during shipment and it includes four flat upstanding side and end walls joined together along a relatively large radius, and a corrugated bottom wall. The corrugations provide a plurality of longitudinally extending flutes or grooves 22. The grooves 22, which are rectangular in cross-section, are spaced apart by a distance approximately equal to the width of the grooves and extend in a direction parallel to one another, thereby to provide a plurality of open-mouthed, hollow fins which protrude into the container. The food to be packaged, which, in FIGS. 2 and 3 is designated 24, fills the tray 16.

The cover 17 is also corrugated and is thus provided with a plurality of grooves 26 which lie parallel to one another and, preferably, in directions perpendicular to the general direction of the grooves 22. The cover 17 is depressed into the food 24 before it is frozen and thus relatively soft, so that the hollow fins 28 on the cover depend directly into intimate contact with the food 24. The cover 17 also has end flanges 30 which overlie the end lip portions of the tray 16 to support the cover 17 in place independently of the food.

In use, the fresh or pre-cooked food to be frozen is placed in the tray 16 and the cover 17 is then pressed into place and the lip portions 20 are folded thereover. Thereafter, the package is placed in a quick-freezing chamber to freeze and thereby preserve the food product. If desired, the completed package might be placed in a polyethylene bag or the like to keep the exterior surfaces clean and to provide space for advertising and the like.

The frozen food product is adapted to be heated or cooked directly in the container 15 in any suitable heating chamber such as an oven or a cooking vessel. Moreover, such items may be heated in a high-speed pressure cooker such as that disclosed in a co-pending application of George Churley, Serial No. 782,303, filed Dec. 22, 1958, now Patent No. 3,071,063, and if desired, the contents of a number of such packages may be heated or cooked at one time. As shown in FIG. 4, the cooker comprises a housing 35 having a cover 36 adapted to hermetically seal the cooking chamber in which the frozen food packages 15 may be supported within a suitable tray 36. Preferably, the packages 15 should lean from the vertical as shown in FIG. 4 to provide good fluid circulation through the grooves on the external surfaces of the packages. High temperature dry steam is introduced into the cooker via a conduit 38 which extends along the upper portion of the cooking chamber and has a plurality of apertures 40 along the bottom side thereof whereby there is provided a plurality of high velocity jets of steam 41 which are directed down onto the packages 15. The stream thus travels along the grooves on both the tops and bottoms of the packages and is thus in close contact with the frozen food contained therein. Inasmuch as all parts of the frozen food are located within a very short distance of the heat conductive walls of the container, extremely rapid thawing occurs, even though the frozen contents may be, essentially, a solid block of ice. Extremely uniform cooking is thus achieved since all parts of the food are elevated to the cooking temperature within a minimum period of time.

Referring now to FIGS. 6 and 7, there is shown a plurality of frozen food packages 44 which are particularly adapted for use in the pressure cookers of the type described in the above-identified application. As best shown in FIG. 7, the packages 44 are generally circular in shape and include a plurality of parallel grooves or flutes 46 on both faces thereof, and the grooves provided on one face of each package extend perpendicularly to the grooves on the opposite face thereof. In order to permit the packages 44 to be suspended in the cooking chamber, they each include a large circular aperture 47 provided in a flange extending peripherally from one edge thereof. The aperture 47 is adapted to fit loosely over the portion of the conduit 37 located within the cooking chamber whereby a plurality of packages may be hung in face-to-face relationship from the conduit 38. Maximum circulation of the heating vapor around the packages is achieved with this arrangement. As shown, the grooves 46 intercept, at an angle of 45 degrees, that particular diameter of the package which coincides with the diameter of the aperture 47. Moreover, the jets spray at an angle of about 45 degrees from the vertical. Other angles or orientation between the conduit 38 and the grooves 46 may be used if desired, but it is believed that preferred results will be achieved by choosing the angles so that a substantial amount of steam from the jets 41 is directed axially of the grooves on both sides of the packages 44.

The packages 44 may each include a pair of additional holes 48a and 48b on opposite sides of the aperture 47 receipt of the prongs of a fork-like tool 49, shown in FIG. 8, for removal of the hot packages from the cooking chamber.

In both of the packages 15 and 44 hollow fins are provided on the top as well as the bottom surfaces of the package so that heat may be transmitted to the food from both sides thereof. For large installations a special tool may be provided in the form of a spatula for easily removing the food from the grooves provided on the inside surfaces of the package walls between adjacent ones of the hollow fins. On the other hand, the use of such a device may be undesirable where smaller quantities of food are generally prepared at one time, as, for example, in the home. For use under such conditions, the fins may be eliminated along one surface of the package and the fins on the other side of the package should then extend a greater distance into the food since it is extremely important that the high temperature cooking medium be brought into proximity with all parts of the food item, including the central portions.

In accordance with another embodiment of the present invention, as illustrated in FIGS. 9 and 10, there is provided a food package 50 in which frozen food is adapted to be contained and stored, and which is used to support the frozen food item during cooking. The package 50 includes a shallow tray 52 having flat, upstanding side wall portions 53 and a flat bottom wall 54, all formed of a good heat conducting material such, for example, as thin aluminum sheeting. The side walls 53 each have a flange portion 56 along the upper peripheral edge thereof which is folded back as shown in FIG. 9 to hold the package in an assembled condition. In addition the package 50 includes a cover 58 also formed of a thin sheet of a good heat-conducting material and which is extremely flexible, as described more fully hereinafter. The cover sheet 58 is generally corrugated and includes a plurality of depending, hollow fins 59 which extend into proximity with the bottom 54 of the tray. The mouths 59a at the tops of the fins 59 are open so that high temperature heating fluid may flow therein into proximity with the food designated 60. In this embodiment of the invention, the fins are extremely narrow to increase the ratio of the heat radiating surface area to the volume of food without unduly reducing the volume of the package available for the food.

When the food item 60 contained in the package 50 is to be cooked, the package 50 is removed from a refrigerator and placed in a cooking chamber into which a heating fluid such as steam, hot water or the like, is introduced. The heating fluid flows into the cavities within the fins and into intimate contact with all portions of the food item 60, thereby quickly to defrost the entire unit and to thereafter commence to preheat the pre-cooked food to approximately 160 degrees Fahrenheit for serving.

Upon completion of the cooking operation the food 60 will be relatively soft, and at that time the tab-like end portions 64 and 65 of the cover can be grasped by the user and pulled apart to apply oppositely directed forces as indicated by the arrows in FIG. 10 to stretch the cover sheet 58 into a substantially planar condition as shown in FIG. 10. In this operation, the fins 59 are withdrawn from the food. With certain types of food products, some of the food will be found to stick to the bottom side of the cover sheet 58, but this can be readily avoided by holding one side edge of the cover in place on the tray and exerting the pulling force on the other tab, so that as the cover 58 stretches out, the lower face thereof scrapes along the adjacent lip 56, whereby all of the food falls into the tray 52 as the cover sheet is stretched out. Inasmuch as all of the sides of the tray 52 are flat, the cooked food may be readily removed therefrom.

Referring now to FIG. 11, there is shown in fragmentary form, a package 70 comprising a tray 71 having a corrugated bottom, and a corrugated top 73, the tray 71 and the cover 73 having matching peripheral flanges 74 and 75 which lie in face-to-face relationship and are held in place by means of a channel member 76. The channel member 176 may be formed of aluminum or it may be formed of plastic. In either event, it should be sufficiently flexible to permit it to be easily removed when one desires to remove the food product from the package. A finger tab portion (not shown) may be provided at one end of the channel to facilitate tearing of the sealing strip 76 from the package.

The packages hereinbefore described are designed for the purpose of rapidly transmitting heat to the contents thereof, and a further improvement in this direction can be achieved by utilization of the phenomena of black body absorption and black body radiation. Accordingly, both the inside and outside surfaces of the package of the present invention should be black, and preferably a dull black, if maximum heat transfer from the high temperature heating medium to the food product is to be achieved.

As an example of the advantages to be achieved by utilizing the features of the present invention, a simple portion of a food item such as beef and sauce, green peppers and mushrooms has a volume of about 16.5 cubic inches. If packed in a prior art type rectangular tray, the usual tray dimensions might be five inches, by six inches, by one-half an inch. Accordingly, the heat must penetrate one-quarter inch of food to reach the innermost parts thereof. On the other hand, with a similar package of the present invention the tray dimensions could be five inches, by six inches, by three-quarters of an inch, but the maximum distance to be penetrated by the heat would be only one-eighth of an inch. Moreover, the ratio of surface area to volume is also doubled. The required storage space for the packages of this invention can be minimized by making the surface grooves equal in width to the spaces between grooves whereby adjacent packages can be interfitted together.

Packages constructed in accordance with the present invention are extremely rigid and sturdy, even though the thickness of the package material may be of the order of forty-thousandths of an inch, so that should the contents thereof be accidentally defrosted during shipment or storage, deformation of the package will not result.

While the present invention has been described in connection with particular embodiments thereof, it will be understood that those skilled in the art may make many changes and modifications without departing from the true spirit and scope of the invention. Therefore, in the appended claims it is intended to cover all such changes and modifications as come within the true spirit and scope of this invention.

I claim:

1. A frozen food package comprising, a relatively rigid tray formed of metal and having a bottom and upstanding side walls substantially filled with a unitary mass of frozen food, said bottom including a plurality of elongated hollow portions each extending a substantial distance into said mass of food at mutually spaced-apart locations with said food being in intimate contact with the bottom of said tray substantially through the entire inner surface area of said bottom portion, a top member formed of metal and secured over the top of said tray and sealably connected to said tray about the respective edges thereof, said top member having a plurality of open-topped hollow fin portions depending into said unitary mass of food at mutually spaced-apart locations and in spaced-apart relationship with the bottom portion of said tray, said tray having a dull, black finish on the inner and outer surfaces thereof.

2. A frozen food package comprising
   a tray having a corrugated bottom and filled with a frozen food item,
   a top member secured to said tray over the top thereof,
   said top member also being corrugated, and both said members being formed of a good heat conducting material.

3. A frozen food package, comprising
   a relatively rigid tray formed of a heat conducting material and having a bottom and upstanding side walls substantially filled with a unitary mass of frozen food,
   said bottom including a plurality of elongated hollow portions each extending a substantial distance into said mass of food at mutually spaced-apart locations with said food being in intimate contact with the bottom of said tray substantially through the entire surface area of said bottom portion,
   a top member formed of a heat conducting material and secured over the top of said tray and sealably connected to said tray about the respective edges thereof,
   said top member having a plurality of open-topped hollow fin portions depending into said unitary mass of food at mutually spaced-apart locations and in spaced-apart relationship with the bottom portion of said tray.

4. The frozen food package of claim 2 wherein the corrugations in said tray extend transverse to the corrugations in said top member.

5. The frozen food package of claim 4 wherein said tray includes a peripherally extending flange portion having an aperture therein for reception of a supporting rod, said corrugations in said tray crossing said corrugations in said top member along a plane interesting said aperture.

References Cited by the Examiner

UNITED STATES PATENTS

| | | | |
|---|---|---|---|
| 1,063,911 | 6/1913 | Chadwick | 126—390 |
| 1,758,567 | 5/1930 | Fernandez | 62—359 |
| 1,939,109 | 12/1933 | Davidson | 62—371 X |
| 2,085,220 | 6/1937 | Howlett | 126—390 |
| 2,123,215 | 7/1938 | Thomas | 62—60 X |
| 2,145,719 | 1/1939 | Geyer | 99—192 |
| 2,433,211 | 12/1947 | Gits | 99—180 |
| 2,500,006 | 3/1950 | Overland | 62—359 |
| 2,875,683 | 3/1959 | Burns. | |
| 2,990,096 | 6/1961 | Crosby | 99—171 |
| 3,008,837 | 11/1961 | Kaplan | 99—192 |

A. LOUIS MONACELL, *Primary Examiner.*

ABRAHAM H. WINKELSTEIN, RAYMOND N. JONES, *Examiners.*